United States Patent
Gaeta et al.

(10) Patent No.: US 11,741,518 B1
(45) Date of Patent: *Aug. 29, 2023

(54) REAL TIME AVATAR

(71) Applicant: United Services Automobile Association (USAA), San Antonio, TX (US)

(72) Inventors: Michael Joseph Gaeta, San Antonio, TX (US); Bipin Chadha, San Antonio, TX (US); Oscar Roberto Tijerina, San Antonio, TX (US); Jeremy Kolt Loukas, San Antonio, TX (US)

(73) Assignee: United Service Automobile Association (USAA), San Antonio, TX (US)

( * ) Notice: Subject to any disclaimer, the term of this patent is extended or adjusted under 35 U.S.C. 154(b) by 187 days.

This patent is subject to a terminal disclaimer.

(21) Appl. No.: 17/216,177

(22) Filed: Mar. 29, 2021

Related U.S. Application Data (63) Continuation of application No. 15/828,167, filed on Nov. 30, 2017, now Pat. No. 10,991,018.

(60) Provisional application No. 62/428,358, filed on Nov. 30, 2016.

(51) Int. Cl.
*G06Q 30/00* (2023.01)
*G06Q 30/0601* (2023.01)
*G06T 13/40* (2011.01)

(52) U.S. Cl.
CPC ..... *G06Q 30/0613* (2013.01); *G06Q 30/0643* (2013.01); *G06T 13/40* (2013.01); *G06T 2200/24* (2013.01)

(58) Field of Classification Search
CPC ............ G06Q 30/0613; G06Q 30/0643; G06T 13/40; G06T 2200/24
USPC ...................................................... 705/26, 27
See application file for complete search history.

(56) References Cited

U.S. PATENT DOCUMENTS

| | | | |
|---|---|---|---|
| 7,728,735 | B2 | 6/2010 | Aaron et al. |
| 7,940,186 | B2 | 5/2011 | Aaron et al. |
| 8,965,828 | B2 | 2/2015 | Greenzeiger et al. |
| 10,354,256 | B1 | 7/2019 | McInerny |
| 10,991,018 | B1 * | 4/2021 | Gaeta ................ G06Q 30/0613 |
| 2004/0082839 | A1 | | 4/2004 Haugen |

(Continued)

OTHER PUBLICATIONS

Avaya Inc.; Patent Issued for Pseudo Agent Matching (U.S. Pat. No. 9,444,940) Marketing Weekly News [Atlanta] Oct. 1, 2016: 381; Dialog #1822131077, 7pgs. (Year: 2016).*

*Primary Examiner* — Robert M Pond
(74) *Attorney, Agent, or Firm* — Fletcher Yoder, PC (57) ABSTRACT

A system includes a server having a database stored thereon, an operator device, and a coordinating device communicatively coupled with the server and with the operator device, wherein the coordinating device comprises a processor and a memory, and wherein the memory is configured to store instructions thereon that, when executed by the processor, cause the coordinating device to perform various steps. The steps include receiving account data, from the server, corresponding with an account of a plurality of accounts saved to the database, receiving preference data, from the operator device, corresponding with preferences of an operator of the operator device and relating to the account data. The steps also include generating an avatar reflecting the account data in accordance with the preference data, and displaying the avatar on a display.

19 Claims, 5 Drawing Sheets

(56) References Cited

U.S. PATENT DOCUMENTS

| | | |
|---|---|---|
| 2004/0147814 A1 | 7/2004 | Zancho et al. |
| 2006/0190822 A1 | 8/2006 | Basson et al. |
| 2009/0002178 A1 | 1/2009 | Guday et al. |
| 2012/0059787 A1 | 3/2012 | Brown et al. |
| 2012/0221404 A1 | 8/2012 | Ahmed et al. |
| 2013/0166274 A1 | 6/2013 | Fagundes et al. |
| 2014/0074728 A1 | 3/2014 | Margulies |
| 2014/0157153 A1 | 6/2014 | Yuen et al. |
| 2017/0221237 A1 | 8/2017 | Pate et al. |
| 2017/0236176 A1 | 8/2017 | Johansson et al. |

\* cited by examiner

REAL TIME AVATAR

CROSS-REFERENCE TO RELATED APPLICATION

This application is a continuation of U.S. application Ser. No. 15/828,167, entitled "REAL TIME AVATAR," filed Nov. 30, 2017, which claims priority to and the benefit of U.S. Provisional Application No. 62/428,358, entitled "REAL TIME AVATAR," filed Nov. 30, 2016, each of which is hereby incorporated by reference in its entirety for all purposes.

BACKGROUND

The present disclosure relates generally to a system and method for customer and customer service interaction. In particular, the present disclosure relates to generating and/or utilizing tools indicative of customer-related information to facilitate improved customer service.

Many product and service oriented businesses provide real-time customer service. For example, a banking institution may provide telephone or text-to-chat customer service for various products and/or services associated with the banking institution, such as checking services, savings services, credit services, credit protection services, loan services, and others.

When a customer contacts a business (e.g., such as the banking institution described above, or a customer service department thereof) seeking assistance, it may be difficult to quickly and efficiently identify a reason for the contact from the customer. For example, traditional techniques may require, among other steps, excessively querying the customer (e.g., via a human or digital customer service representative) to determine the reason for the contact from the customer. Results from the customer service representative querying the customer may be inaccurate and/or time consuming, which may waste resources and frustrate the customer. Further, traditional techniques may not effectively inform the customer service representative of important information associated with the customer. Accordingly, improved identification and understanding of the customer, and improved customer service, may be desired.

BRIEF DESCRIPTION

An embodiment of the present disclosure includes a system including a server having a database stored thereon, an operator device, and a coordinating device communicatively coupled with the server and with the operator device, wherein the coordinating device comprises a processor and a memory, and wherein the memory is configured to store instructions thereon that, when executed by the processor, cause the coordinating device to perform various steps. The steps include receiving account data, from the server, corresponding with an account of a plurality of accounts saved to the database, receiving preference data, from the operator device, corresponding with preferences of an operator of the operator device and relating to the account data. The steps also include generating an avatar reflecting the account data in accordance with the preference data, and displaying the avatar on a display.

Another embodiment of the present disclosure includes a method. The method includes receiving account data, from a server and at a coordinative device, corresponding with an account of a plurality of accounts saved to a database included on the server. The method also includes receiving preference data from an operator device and at the coordinating device, the preference data corresponding with an account of a plurality of accounts saved to a database included on the server. The method also includes generating, via the coordinating device, an avatar reflecting the account data in accordance with the preference data. The method also includes outputting the avatar on a display.

Another embodiment of the present disclosure includes a customer service system. The customer service system includes a server having a database stored thereon, where the database includes account data indicative of a plurality of customer accounts. The customer service system also includes operator circuitry and coordinating circuitry, where the coordinating circuitry is communicatively coupled to, and between, the server and the operator circuitry. The coordinating circuitry is configured to receive operator preference data from the operator circuitry, to receive a portion of the account data from the server, and to format an avatar, in accordance with the preference data, indicative of the portion of the account data from the server, where the portion of the account data reflects a customer account of the plurality of customer accounts. The system also includes a display configured to output the avatar.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward a system and method of generating and/or utilizing a digital avatar. In particular, the present disclosure relates to generating and/or utilizing a digital avatar representative of a customer or traits of a customer to facilitate improved customer service.

For example, a product or service oriented business, such as a banking or insurance institution, may maintain a customer service department that assists customers or potential customers of the business. In some embodiments, some or all of the customer service department may be outsourced to a third party business. In accordance with present embodiments, an avatar generating system may be interfaced (or incorporated) with the customer service system or department. It should be noted, however, that the avatar generating system, in accordance with present embodiments, may be interfaced with other systems configured to facilitate a better understanding of an individual or entity represented by the avatar.

The avatar generating system may include a coordinating device that generates the avatar. The coordinating device may receive information associated with a customer for which generation of an avatar is sought. For example, an operator of the avatar generating system (e.g., a customer service representative of the customer service department, or an automated operator triggered in response to a customer contact) may communicate to the coordinating device a request for generation of an avatar representative of a particular customer (e.g., a customer from which the customer service representative received a communication or inquiry). The coordinating device may receive the information associated with the customer from a customer account stored to a server database maintained by the business (e.g., banking institution) or the third party business (e.g., which maintains the customer service department for the business). The customer account may be pre-populated with the information from one or more sources, and the customer account may be updated with information from the one or more sources at any time. For example, as described in detail below with reference to the figures, the one or more sources may include the customer, social media accounts of the customer, other accounts of the customer (e.g., government maintained accounts, other accounts with the business or other businesses), a representative of the business, a family member of the customer, wearable devices, or other sources. The information may be manually entered to the customer account (e.g., by the customer, the family member of the customer, or the representative of the business), or the information may be automatically transmitted/saved to (e.g., gathered or received by) the customer account on the database (e.g., by way of a software program scanning the customer's social media accounts, such as text analysis software).

The coordinating device may also receive, from the operator of the avatar generating system (e.g., the customer service representative), data indicative of preferences regarding an aesthetic and/or a style of the avatar. For example, the operator may instruct or request that the coordinating device generate the avatar to include certain features. Accordingly, each operator of the avatar generating system may customize the avatar to his or her preference(s). By enabling the operator to customize the avatar, the operator's understanding of the customer and the operator's communication with the customer may be improved. For example, a particular operator may align his or her unique communication skills with the types of avatar features most beneficial for his or her unique communication skills. Accordingly, interaction between the operator and the customer may be improved, and resources required to assist the customer are reduced. The types, styles, and aesthetics of example avatars will be described in detail below with reference to the figures. However, in general, the avatar may include representations of information stored to the account such as: identification information of an individual (e.g., the customer) associated with the account (e.g., name, social security number, birthdate), qualifications of the individual (e.g., occupation, job, military rank, education level, professional level), familial information of the individual, demographic information of the individual, business interactions between the customer and the individual (e.g., products/services paid for by the customer and provided by the business), a health of the individual, and/or other information.

Figure 1:
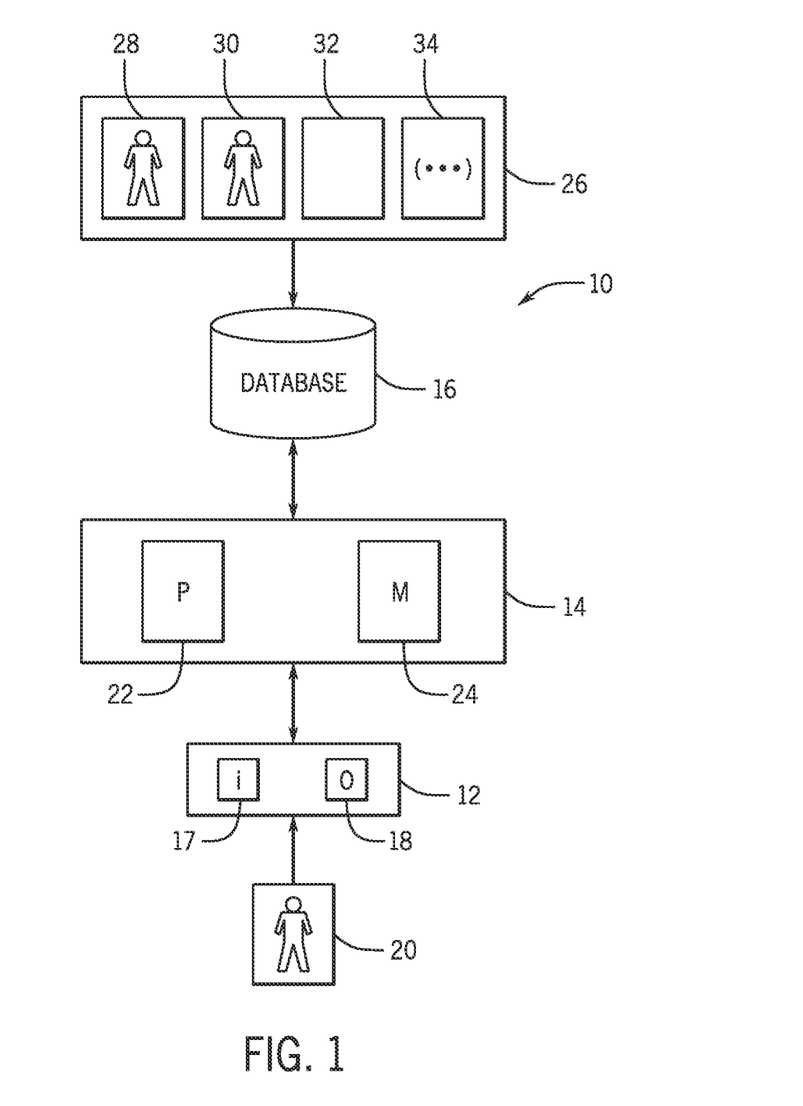
FIG. 1 is a schematic illustration of an embodiment of an avatar generating system, in accordance with an aspect of the present disclosure.

FIG. 1 is a schematic illustration of an embodiment of an avatar generating system 10 configured to generate an avatar (e.g., representative of an individual or entity, such as a customer of a business). For example, the avatar generating system 10 may include an operator input/output device 12, a coordinating device 14, and a server database 16 (e.g., a database stored on a server, or "database" as used herein). The operator input/output device 12 may be, for example, a computer having one or more input components 17 (e.g., a keyboard, a mouse), and having one or more output components 18 (e.g., a display, a speaker). In some embodiments, the operator device 12 and the coordinating device 14 may be included in a single, multi-functional device. For example, the multi-functional device may include circuitry associated with the operator device 12 ("operator circuitry") and circuitry associated with the coordinating device 14 ("coordinating circuitry"). In general, the operator device 12 and the coordinating device 14 are described as separate components in the discussion below, but it should be understood that the operator and coordinating devices 12, 14 may form a single, multi-functional device, as noted above.

An operator 20 (e.g., a customer service representative) may utilize the input component 17 of the operator input/output device 12 to communicate to the coordinating device 14, and the coordinating device 14 may utilize the output component 18 of the operator input/output device 12 to communicate back to the operator 20. For example, the operator 20 may transmit communications (e.g., via the input component 17) from the operator input/output device 12 to the coordinating device 14 to alter, control, customize, or manipulate how (or what) the coordinating device 14 communicates back to the operator input/output device 12. In particular, the operator 20 may transmit communications from the operator input/output device 12 to the coordinating device 14 to customize features included with (e.g., displayed on) an avatar (e.g., representative of a customer), where the coordinating device 14 arranges and communicates an image of the avatar back to operator 20 (e.g., through the output component 18, such as a display having a graphical user interface [GUI], of the operator input/output device 12).

To generate the avatar (e.g., representative of a customer), the coordinating device 14 may receive the communications from the operator 20 referenced above (e.g., by way of the operator input/output device 12), and the coordinating device 14 may receive data from the database 16. The database 16 may include several accounts, each account corresponding with, for example, a particular customer (and, thus, a potential avatar generated by the avatar generating system 10). Accordingly, when the coordinating device 14 accesses data from the database 16, the coordinating device 14 may access a particular customer account stored to the database 16, for example, in response to a request from the operator 20 (or some other input indicative of a request for generation of an avatar representative of the customer, or customer account thereof).

More particularly, the coordinating device 14 may include a processor 22 and a memory 24 having instructions stored thereon that, when executed by the processor 22, cause the coordinating device 14 to perform certain steps. In accordance with present embodiments, the instructions may cause the coordinating device 14 to, in response to an input (e.g., from the operator 20), access an account (e.g., of a plurality of accounts) stored to the database 16. The account may include a variety of information stored thereto. For example, in embodiments where the account is a customer account, the account may include identification information of the customer, including personal information, family information, and/or demographics information.

The account may also include other types of data, such as data relating to a relationship between the customer and the business utilizing the avatar generating system 10. Customer/business relationship data may include data relating to products or services paid for by the customer, products or services the customer is (or may be) interested in, an extent or magnitude to which the customer has engaged, utilized, or invested in a particular product or service, and/or other data. Other information may also be included in the customer account, such as information indicative of a temperament of the customer. In some embodiments, certain of the information utilized to generate the avatar (e.g., such as temperament information) may be supplemented by the operator in real-time (e.g., based on a behavior or a response of the customer at the time the customer communicates with the operator).

In general, the information stored to the account (e.g., in the database 16) may come from one or more sources 26. For example, the information stored to the account may include identification information of an individual (e.g., customer) associated with the account (e.g., name, social security number), qualifications of the individual (e.g., occupation, job, military rank, education level, professional level), familial information of the individual, demographic information of the individual, business interactions between the customer and the individual (e.g., products/services paid for by the customer and provided by the business), a health of the individual, and/or other information. The sources 26 from which the information stored to the account may be derived include the individual (e.g., customer 28) associated with the account, a family member 30 of the customer 28, a social media account 32 of the customer 28, or others 34 (e.g., a wearable device). As described above, certain of the information utilized to generate the avatar (e.g., preference data, temperament information) may come from the operator 20, or from some reference other than the customer account on the database 16.

For example, the operator 20 may communicate preferences regarding the avatar to the coordinating device 14 (e.g., via the inputs 17 of the operator input/output device 12). In other words, the operator's use of the inputs 17 may be relayed to the coordinating device 14. Preferences of the operator 20 may include a style of the avatar, a format of the avatar, what type of information is reflected by (or included in) the avatar, and other preferences. Accordingly, the coordinating device 14 may receive the data from the database 16, in addition to whatever preferences are relayed to the coordinating device 14 by the operator 20 (e.g., via the inputs 17 of the operator input/output device 12), and may generate the avatar by incorporating the data received from the database 16 in accordance with the preferences of the operator 20. The avatar may be displayed on the output 18 (e.g., a monitor having a GUI) of the operator input/output device 12.

By considering the preferences of the operator 20, the coordinating device 14 may assemble an avatar that assists the particular operator 20 in, for example, helping a customer corresponding with the avatar. As will be described in detail below, the avatar generating system 10 may be employed in several different contexts, including a customer service context. Further, the avatar generating system 10 may be capable of generating avatars that convey to the operator 20 identification information of an individual (e.g., customer) associated with the account (e.g., name, social security number), qualifications of the individual (e.g., occupation, job, military rank, education level, professional level), familial information of the individual, demographic information of the individual, business interactions between the customer and the individual (e.g., products/services paid for by the customer and provided by the business), a health of the individual, and/or other information.

Figure 2:
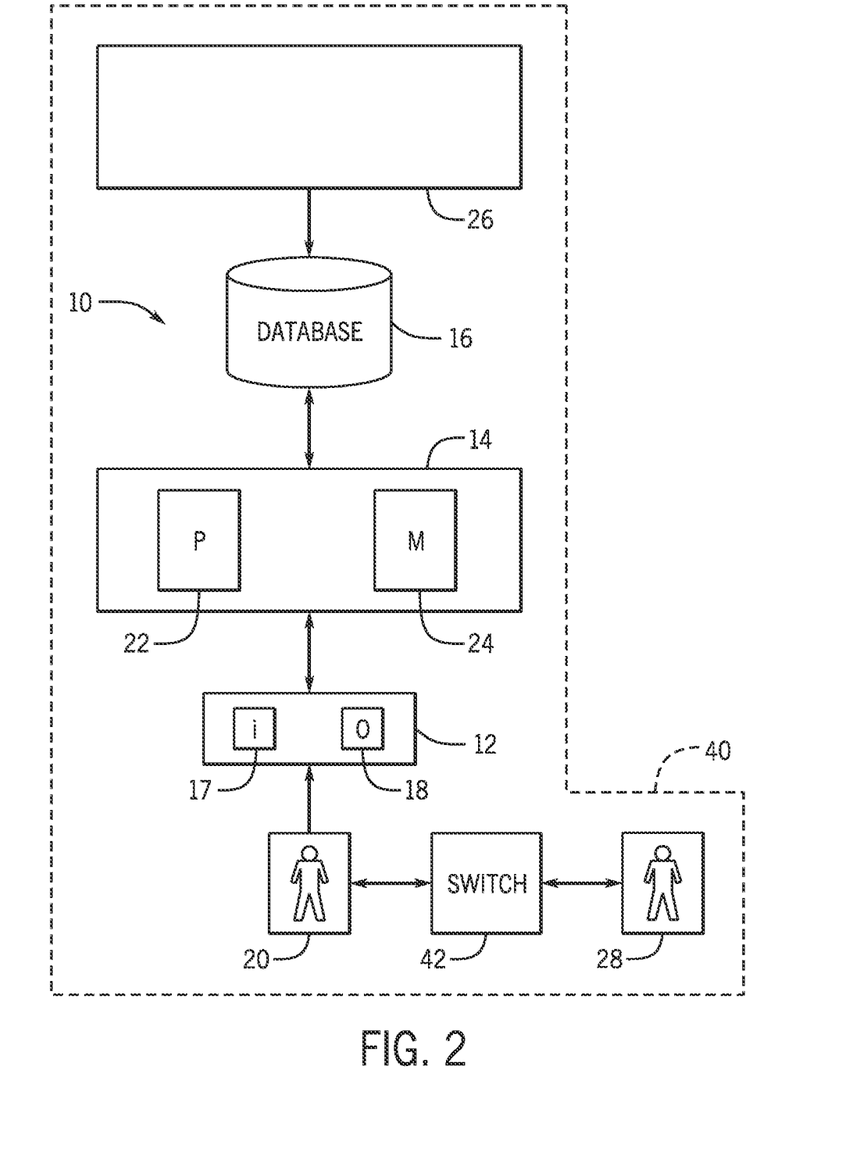
FIG. 2 is a schematic illustration of an embodiment of a customer service call center having the avatar generating system of FIG. 1, in accordance with an aspect of the present disclosure.

Turning now to FIG. 2, a schematic illustration of an embodiment of a customer service call center 40 having the avatar generating system 10 of FIG. 1 is shown. It should be noted that the avatar generating system 10 may be a part of the call center 40, or the avatar generating system 10 may be separate from the call center 40 (e.g., where the call center 40 engages, utilizes, or otherwise interacts with the separate avatar generating system 10).

As shown in the illustrated embodiment, a switch 42 of the call center 40 may receive a communication from the customer 28. For example, the customer 28 may call the call center 40 seeking assistance regarding a particular product or service offered by the business maintaining (or utilizing) the call center 40, and the switch 42 may receive the call. The switch 42 may route the call to the customer service representative 20 based on call routing decisions determined by a processor of the switch 42. The call routing decisions may be related to, or totally separate from, generation of the avatar. In one embodiment, call routing information is incorporated into aspects of the avatar.

As previously described, the avatar generating system 10 may generate an avatar representative of customer data saved to a customer account in the database 16 of the avatar generating system 10, where the customer account corresponds with the customer 28. Accordingly, when the switch 42 receives the communication from the customer 28 and/or routes the customer 28 to the customer service representative 20, the coordinating device 14 may be notified (e.g., by the operator input/output device 12 of the avatar generating system 10, by the switch 42 of the call center 40, or by some other intervening component) that generation of an avatar corresponding with the customer 28 is desired.

The coordinating device 14, as previously described, may receive (or gather) information from the customer account stored to the database 16. Further, the coordinating device 14 may receive the preference information or data from the customer service representative 20 (e.g., via the operator input/output device 12). The coordinating device may then generate the avatar based at least in part on the data received from the database 16, and based at least in part on the preference data received from the customer service representative 20 through the operator input/output device 12. It should be noted that the preference data may be selectively input by the customer service representative 20 at any time (e.g., for each individual call), or the preference data may be pre-set by the customer service representative 20 (e.g., applicable to all calls). Further, in some embodiments, a supervisor may set default preferences applicable to all representatives. The default preferences may be overridable, or the default preferences may be locked. Further still, it should be noted that the preference data may (a) be analyzed by the coordinating device 14 to enable the coordinating device 14 to determine which data to gather from the customer account (e.g., to generate the avatar), or (b) be applied to all the information from the customer account after the coordinating device 14 gathers all the information from the customer account (e.g., to filter out information not desired by the operator 20 for generation of the avatar). After the avatar is generated, the coordinating device 14 may communicate data indicative of the avatar to the operator input/output device 12, and the avatar may be displayed on a monitor of the output 18 of the operator input/output device 12 (e.g., via a GUI).

Figure 3:
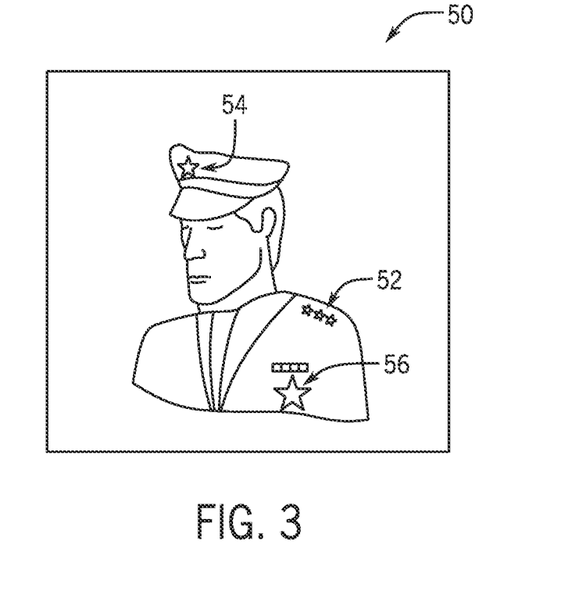
FIG. 3 is a schematic illustration of an embodiment of an avatar generated by the avatar generating system of FIG. 1, in accordance with an aspect of the present disclosure.

Turning now to FIG. 3, a schematic illustration of an embodiment of an avatar 50 (e.g., human avatar) generated by the avatar generating system 10 of FIG. 1 is shown. In the illustrated embodiment, the avatar 50 is a cartoon image (e.g., schematic image) of a human, and representative of a particular customer. For example, the avatar 50 includes a first identifying feature 52 (e.g., on a shoulder pad of the avatar 50), a second identifying feature 54 (e.g., on a hat of the avatar 50), and a third identifying feature 56 (e.g., on a breast pocket of the avatar 50). The identifying features 52, 54, 56 may be indicative of an occupation of the customer, a rank of the customer, a military rank of the customer, a military division of the customer, a level of education of the customer, a health of the customer, or any other identifying information.

It should be noted that certain identifying features of the customer may be implied in the avatar 50 by way of physical characteristics of the cartoon human, as opposed to symbols disposed on, for example, clothing of the cartoon human. Identifying features incorporated in the avatar 50 via physical characteristics of the cartoon human may be referred to herein as "implied identifying features." For example, implied identifying features may include an age of the customer (e.g., represented by a general appearance of the age of the cartoon human forming the avatar 50), a race or ethnicity of the customer (e.g., represented by a general appearance of the race or ethnicity of the cartoon human forming the avatar 50), a gender or sex of the customer (e.g., represented by a general appearance of the gender or sex of the cartoon human forming the avatar 50), and/or a weight or height of the customer (e.g., represented by a general appearance of the weight or height of the cartoon human forming the avatar 50). As previously described, the operator of the avatar generating system may enter preferences regarding, for example, a number or type of identifying features included in the avatar 50. The avatar generating system may use regulatory constraints and other methods to determine which features can be used in the current setting/conversation, and which features cannot be used, and presents the features accordingly.

Figure 4:
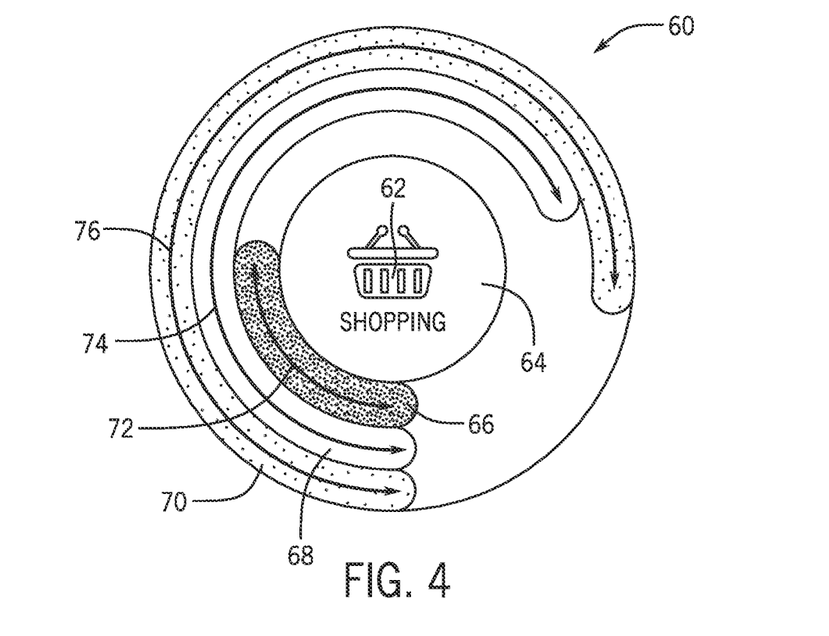
FIG. 4 is a schematic illustration of another embodiment of an avatar generated by the avatar generating system of FIG. 1, in accordance with an aspect of the present disclosure.

Turning now to FIG. 4, a schematic illustration of another embodiment of an avatar 60 (e.g., chart/graph avatar) generated by the avatar generating system 10 of FIG. 1, for use by a customer service representative of the customer service call center 40 of FIG. 2, is shown. The embodiment of the avatar 60 illustrated in FIG. 4 differs from the embodiment of the avatar 50 illustrated in FIG. 3 in that the avatar 60 in FIG. 4 employs charts and/or graphs to represent data, whereas the avatar 50 in FIG. 3 employs a cartoon human to represent data. As previously described, the operator of the avatar generating system may select which type of avatar (e.g., the avatar 50 of FIG. 3, or the avatar 60 of FIG. 4) the operator prefers.

Figures 5, 6:
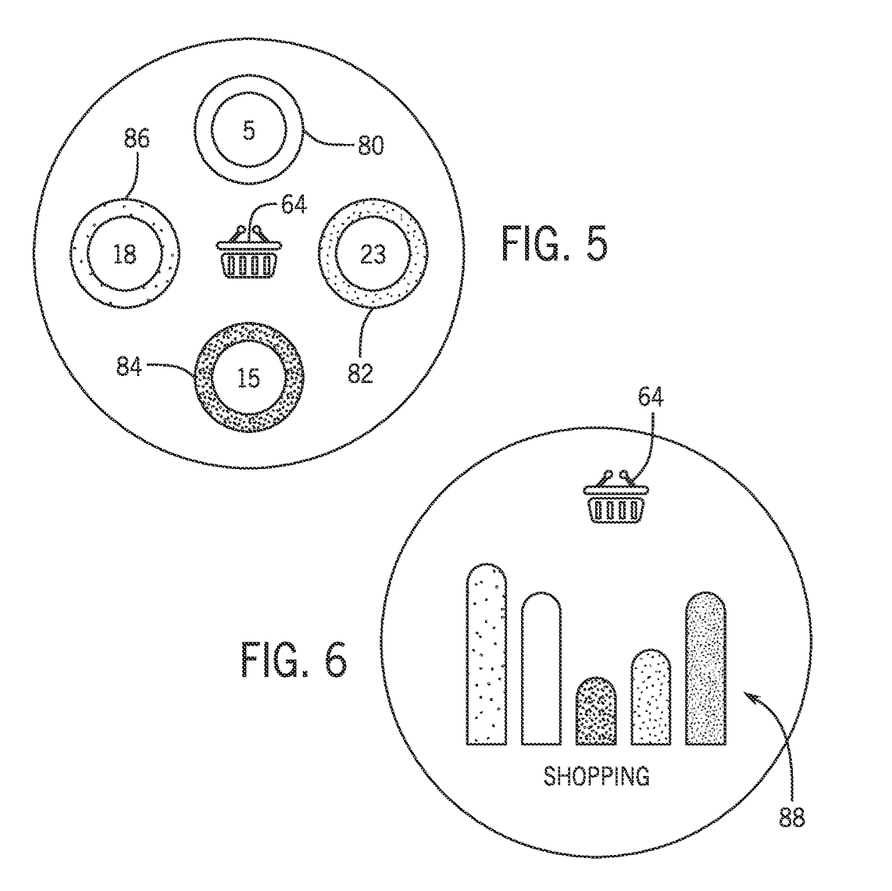
FIG. 5 is a schematic illustration of another embodiment of an avatar generated by the avatar generating system of FIG. 1, in accordance with an aspect of the present disclosure.
FIG. 6 is a schematic illustration of another embodiment of an avatar generated by the avatar generating system of FIG. 1, in accordance with an aspect of the present disclosure.

In the embodiment of the avatar 60 illustrated in FIG. 5, the avatar 60 includes a circular arrangement having one or more arcuate segments extending circumferentially about a central point 62. For example, the illustrated avatar 60 includes a first arcuate segment 66 disposed radially adjacent to the central point 62, a second arcuate segment 68 having a radius larger than that of the first arcuate segment 66, and a third arcuate segment 70 having a radius larger than that of the second arcuate segment 68. As shown, the first, second, and third arcuate segments 66, 68, 70 are disposed concentric with one another about the central point 62.

In some embodiments, an object or subject 64 of the avatar 60 may be disposed at the center point 62. Further, each of the arcuate segments 66, 68, 70 may convey different information relating to the object or subject 64. For example, as shown, the subject 64 may be "shopping." An arcuate length 72 of the first arcuate segment 66 may represent a number of days since the customer corresponding with the avatar 60 purchased (e.g., shopped for) a product or service with the business maintaining the avatar generating system. An arcuate length 74 of the second arcuate segment 68 may represent an amount of money the customer has spent on the product or service with the business. An arcuate length 76 of the third arcuate segment 70 may represent an amount of money available in the customer's bank account for use on a new product or service with the business. Of course, a maximum value of each of the arcuate lengths 72, 74, 76 is 360 degrees. The operator, by way of the preference data communicated to the coordinating device, may determine a correlation between the maximum value (e.g., 360 degrees) of the arcuate lengths 72, 74, 76, and the information represented by each corresponding arcuate segment 66, 68, 70. For example, if the arcuate segment 66 represents a total number of days since the customer last shopped, the operator may set the minimum value (e.g., 0 degrees) as "0 days," and the operator may set the maximum value (e.g., 360 degrees) as 360 days. Accordingly, each degree of the arcuate length 72 may represent one day. In other embodiments, the correlation may be automatically determined, or determined by some other source. Further, in some embodiments, the maximum value of each length 72, 74, 76 (e.g., of each arcuate segment 66, 68, 70, respectively) may be less than 360 degrees. In other words, the "circular arrangement" of the avatar 60 may be semi-circular, such as a 180 degree semi-circular arrangement, or a 90 degree semi-circular arrangement.

It should be noted that the above description is non-limiting. For example, the subject 64 may not be shopping. The subject 64 may relate to shopping, familial status, customer identification information, a particular product owned or utilized by the customer, a particular service purchased or used by the customer, or any other subject, and the corresponding arcuate segments 66, 68, 70 may correspond with information relating to said subject 64. In some embodiments, the arcuate segments 66, 68, 70 may represent financial products (e.g., top three financial products the customer uses or desires, based on customer account information).

Further, it should be noted that multiple avatars 60 (and/or 50) may be generated and employed. For example, the operator of the avatar generating system may prefer multiple avatars. In the illustrated embodiment, the avatar 60 includes a circular arrangement having a plurality of arcuate segments 66, 68, 70 relating to the subject 64 (e.g., shopping) of the avatar 60 (e.g., with respect to the customer that the avatar 60 represents). As suggested above, the operator of the avatar generating system may prefer several of the avatars 60, each avatar 60 relating to a different subject 64.

Further still, it should be noted that other graph/chart type avatars 60 may be employed. For example, turning now to FIGS. 5-7, schematic illustrations of embodiments of chart/graph type avatars 60 generated by the avatar generating system 10 of FIG. 1 is shown. The avatar 60 of FIG. 5 includes the subject 64, in addition to several magnitude metrics 80, 82, 84, 86. Each magnitude metric may be representative of an amount of something represented by the magnitude metric 80, 82, 84, 86. For example, the magnitude metrics 80, 82, 84, 86 may be labeled (e.g., with text, pictures) to indicate what each magnitude metric 80, 82, 84, 86 represents (e.g., a number of days since the customer last shopped, an amount of money spent on a product or a service, an amount of money available in the customer's bank account for shopping). Alternatively, because the operator may select, by way of the preference data, which magnitude metrics 80, 82, 84, 86 to include, and where to include each magnitude metric 80, 82, 84, 86 on the avatar 60, labels may not be required and may facilitate efficient use of visual information. In other words, the operator may be aware of the information conveyed by each magnitude metric 80, 82, 84, 86 without needing labels.

Figure 7:
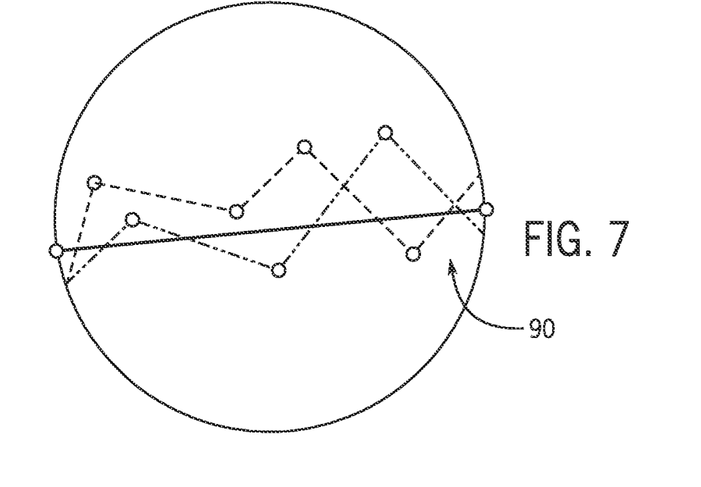
FIG. 7 is a schematic illustration of another embodiment of an avatar generated by the avatar generating system of FIG. 1, in accordance with an aspect of the present disclosure.

FIG. 6 represents another type of chart/graph type avatar 60. For example, FIG. 6 includes a bar graph 88 indicative of information of the customer (or the customer account), in accordance with the descriptions above. FIG. 7 also represents another type of chart/graph type avatar 60. For example, FIG. 7 includes a line graph 90 indicative of information of the customer (or customer account), in accordance with the descriptions above.

Figure 8:
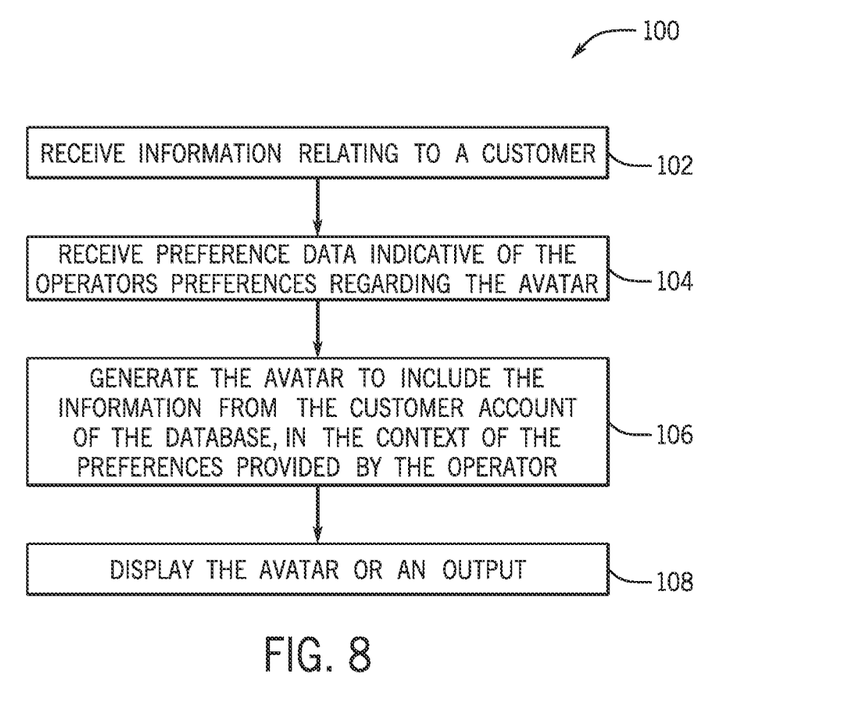
FIG. 8 is a process flow diagram illustrating a method of generating an avatar via the avatar generating system of FIG. 1, in accordance with an aspect of the present disclosure.

Turning now to FIG. 8, a process flow diagram illustrating an embodiment of a method 100 of generating an avatar via the avatar generating system of FIG. 1 is shown. In the illustrated embodiment, the method 100 includes receiving (block 102) (e.g., at a coordinating device and from a customer account saved to a server database) information relating to an individual or entity (e.g., a customer). For example, as previously described, the database may include a plurality of customer accounts thereon. The coordinating device may be prompted to generate an avatar from a particular customer account stored to the database, and the coordinating device may access the customer account to retrieve (or receive) the information pre-populated in the customer account.

The method 100 also includes receiving (block 104) (e.g., at the coordinating device and from an operator of the avatar generating system) preference data indicative of the operator's preferences regarding the avatar. For example, the operator may prefer certain information to be included in the avatar. The operator may also prefer a particular type of avatar (e.g., having a particular aesthetic or style). The operator may set the operator's preferences (e.g., via an operator input/output device) such that the coordinating device generates an avatar that the operator believes will be most useful to him or her. The avatar generating system may learn the preferences over time, and may produce more relevant avatars over time to the operators (e.g., based at least in part on the learned preferences). For example, the system may include a machine learning component that determines at least a portion of the preference data (e.g., for a particular avatar being generated) corresponding with the operator's preferences (e.g., without data entry by the operator for the particular avatar being generated). In other words, the machine learning component may learn the operator's preferences, and facilitate generation of a particular avatar without the operator having to enter his or her preferences.

The method 100 also includes generating (block 106), via the coordinating device, the avatar to include the information received from the database (or customer account thereof), in the context of the preferences provided by the operator. For example, as previously described, the operator preferences may control which information the coordinating device retrieves from the customer account on the database, or the operator preferences may narrow or limit how the coordinating device generates the avatar after the coordinating device retrieves all the information included in the customer account. The avatar may then be displayed (block 108) on an output (e.g., a monitor having a GUI displayed thereon) of the operator input/output device.

As may be appreciated, the current embodiments result in more efficient customer service. For example, generation of the avatars described above may facilitate the operator's improved understanding of the customer. Based on said improved understanding, interaction between the customer and the operator (e.g., customer service representative) may be improved.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. One or more tangible, non-transitory, computer readable media having instructions stored thereon that, when executed by one or more processors, cause the one or more processors to:
   receive account data corresponding to a customer account of a plurality of customer accounts saved to a database;
   receive visual preference data corresponding to one or more preferences of a customer service representative; and
   generate, based on the account data and the visual preference data, an avatar representative of the customer account or a customer associated with the customer account and stylized in accordance with the one or more preferences of the customer service representative; and
   display an illustration of the avatar on a display of an operator device corresponding to the customer service representative.

2. The one or more tangible, non-transitory, computer readable media of claim 1, wherein the instructions, when executed by the one or more processors, cause the one or more processors to generate the avatar such that the avatar includes a visual human representation of the customer corresponding to the customer account.

3. The one or more tangible, non-transitory, computer readable media of claim 2, wherein the instructions, when executed by the one or more processors, cause one or more processors to generate the avatar such that the avatar includes the visual human representation of the customer corresponding to the customer account, and such that the visual human representation of the customer corresponding to the customer account includes:
  a representation of an occupation corresponding the customer;
  a representation of a military rank corresponding to the customer;
  a representation of a military division corresponding to the customer;
  a representation of a level of education of the customer;
  a representation of a professional level of the customer; or
  a representation of a health status of the customer.

4. The one or more tangible, non-transitory, computer readable media of claim 1, wherein the instructions, when executed by the one or more processors, cause the one or more processors to generate the avatar such that the avatar includes a circular arrangement having a plurality of arcuate segments concentric about a common middle point, wherein the plurality of arcuate segments represents a corresponding plurality of characteristics of the account data, and wherein a length of each arcuate segment of the plurality of arcuate segments represents a magnitude or extent of a corresponding characteristic of the corresponding plurality of characteristics of the account data.

5. The one or more tangible, non-transitory, computer readable media of claim 4, wherein the instructions, when executed by the one or more processors, cause the one or more processors to receive the visual preference data corresponding to the one or more preferences of the customer service representative, including data indicative of a total number of arcuate segments to include in the plurality of arcuate segments of the circular arrangement of the avatar.

6. The one or more tangible, non-transitory, computer readable media of claim 4, wherein the instructions, when executed by the one or more processors, cause the one or more processors to receive the visual preference data corresponding to the one or more preferences of the customer service representative, including data indicative of a selection of characteristics included in the corresponding plurality of characteristics of the account data.

7. The one or more tangible, non-transitory, computer readable media of claim 1, wherein the instructions, when executed by the one or more processors, cause the one or more processors to:
  receive the account data from a server on which the database is stored; and
  receive the visual preference data from the operator device corresponding to the customer service representative.

8. The one or more tangible, non-transitory, computer readable media of claim 7, wherein the instructions, when executed by the one or more processors, cause the one or more processors to output data indicative of the avatar to the operator device corresponding to the customer service representative.

9. A method, comprising:
  receiving, from a server, account data corresponding to a customer account of a plurality of customer accounts saved to a database;
  receiving, from an operator device corresponding to a customer service representative, visual preference data corresponding to one or more preferences of the customer service representative;
  generating, based on the account data and the visual preference data, an avatar representative of the customer account or a customer associated with the customer account and stylized in accordance with the one or more preferences of the customer service representative; and
  displaying an illustration of the avatar on a display of the operator device.

10. The method of claim 9, comprising generating the avatar such that the avatar includes a visual human representation of the customer corresponding to the customer account.

11. The method of claim 10, comprising generating the avatar such that the avatar includes the visual human representation of the customer corresponding to the customer account, and such that the visual human representation of the customer corresponding to the customer account includes:
  a representation of an occupation corresponding the customer;
  a representation of a military rank corresponding to the customer;
  a representation of a military division corresponding to the customer;
  a representation of a level of education of the customer;
  a representation of a professional level of the customer; or
  a representation of a health status of the customer.

12. The method of claim 9, comprising:
  communicating, to the operator device corresponding to the customer service representative, a plurality of preference options; and
  receiving, from the operator device corresponding to the customer service representative, the visual preference data corresponding to the preferences of the customer service representative, wherein the visual preference data corresponding to the preferences of the customer service representative is based on an input to the operator device corresponding to a selection from the plurality of preference options.

13. The method of claim 9, comprising receiving a customer communication at the operator device prior to:
  receiving, from the server, the account data corresponding to the customer account of the plurality of customer accounts saved to the database; and
  generating, based on the account data and the visual preference data, the avatar representative of the customer account or the customer associated with the customer account and stylized in accordance with the one or more preferences of the customer service representative.

14. A system, comprising:
  an operator device corresponding to a customer service representative; and
  one or more processors configured to:
    receive account data corresponding to a customer account;
    receive, from the operator device corresponding to the customer service representative, preference data indicative of one or more preferences of the customer service representative regarding a visualization of the customer account or a customer corresponding to the customer account;

generate, based on the account data and the preference data, an avatar representative of the customer account or the customer corresponding to the customer account and stylized in accordance with the one or more preferences of the customer service representative; and cause the operator device to display an illustration of the avatar on a display of the operator device.

15. The system of claim 14, wherein the one or more processors is configured to receive the account data from a wearable device or a social media account.

16. The system of claim 14, comprising a server having a database hosted thereon, the database storing a plurality of customer accounts including the customer account, wherein the one or more processors is configured to receive the account data from the server.

17. The system of claim 14, wherein the one or more processors is configured to generate the avatar such that the avatar includes a visual human representation of the customer corresponding to the customer account, and such that the visual human representation of the customer corresponding to the customer account includes:

a representation of an occupation corresponding the customer;

a representation of a military rank corresponding to the customer;

a representation of a military division corresponding to the customer;

a representation of a level of education of the customer;

a representation of a professional level of the customer; or a representation of a health status of the customer.

18. The system of claim 14, comprising a multi-functional device having the operator device and the one or more processors.

19. The system of claim 14, comprising a switch configured to:

receive a customer communication corresponding to the customer; and route the customer communication to the operator device corresponding to the customer service representative.

* * * * *

UNITED STATES PATENT AND TRADEMARK OFFICE
CERTIFICATE OF CORRECTION

PATENT NO. : 11,741,518 B1
APPLICATION NO. : 17/216177
DATED : August 29, 2023
INVENTOR(S) : Michael Joseph Gaeta et al.

It is certified that error appears in the above-identified patent and that said Letters Patent is hereby corrected as shown below:

On the Title Page

In Item (73), under "Assignee", in Column 1, Line 1, delete "United Service Automobile Association (USAA)," and insert -- United Services Automobile Association (USAA), --, therefor.

In Item (74), under "Attorney, Agent, or Firm", in Column 2, Line 1, delete "Fletcher Yoder, PC" and insert -- Fletcher Yoder, P.C. --, therefor.

In the Specification

In Column 1, Line 8, delete "2017," and insert -- 2017, now Pat. No. 10,991,018, --, therefor.

In Column 2, Line 25, delete "DRAWINGS" and insert -- BRIEF DESCRIPTION OF THE DRAWINGS --, therefor.

In the Claims

In Column 10, Lines 57-58, in Claim 1, delete "representative; and" and insert -- representative; --, therefor.

In Column 11, Line 16, in Claim 3, delete "the" and insert -- to the --, therefor.

In Column 12, Line 26, in Claim 11, delete "the" and insert -- to the --, therefor.

In Column 14, Line 3, in Claim 17, delete "the" and insert -- to the --, therefor.

Signed and Sealed this
Twenty-first Day of November, 2023

Katherine Kelly Vidal
*Director of the United States Patent and Trademark Office*